(12) United States Patent
Chida et al.

(10) Patent No.: US 7,260,204 B2
(45) Date of Patent: Aug. 21, 2007

(54) TELEPHONE TERMINAL EQUIPMENT AND TERMINAL CONTROL PROGRAM

(75) Inventors: Susumu Chida, Ichinomiya (JP); Shozo Kabeya, Gamagori (JP); Hideaki Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 651 days.

(21) Appl. No.: 10/657,150

(22) Filed: Sep. 9, 2003

(65) Prior Publication Data
US 2004/0101116 A1    May 27, 2004

(30) Foreign Application Priority Data
Sep. 10, 2002    (JP)    ............... 2002-264116

(51) Int. Cl.
*H04M 3/42*    (2006.01)
(52) U.S. Cl. ............... 379/212.01; 379/201.01
(58) Field of Classification Search ........... 379/211.01, 379/212.01, 213.01, 214.01, 218.02
See application file for complete search history.

(56) References Cited

U.S. PATENT DOCUMENTS

| | | | | |
|---|---|---|---|---|
| 5,274,700 A | * | 12/1993 | Gechter et al. | 379/211.01 |
| 5,422,942 A | * | 6/1995 | Kakwashima | 379/212.01 |
| 5,432,845 A | * | 7/1995 | Burd et al. | 379/211.01 |
| 5,590,187 A | * | 12/1996 | Greenspan | 379/212.01 |
| 5,796,812 A | * | 8/1998 | Hanlon et al. | 379/212.01 |
| 5,960,073 A | * | 9/1999 | Kikinis et al. | 379/265.04 |
| 6,038,293 A | * | 3/2000 | McNerney et al. | 379/88.19 |
| 6,175,564 B1 | * | 1/2001 | Miloslavsky et al. | 370/352 |
| 6,480,599 B1 | * | 11/2002 | Ainslie et al. | 379/265.02 |
| 6,836,541 B2 | | 12/2004 | Inoue et al. | |

FOREIGN PATENT DOCUMENTS

| | | |
|---|---|---|
| JP | 4-87443 A | 3/1992 |
| JP | 8-65390 A | 3/1996 |
| JP | 11-103350 A | 4/1999 |
| JP | 2001-358826 A | 12/2001 |

* cited by examiner

*Primary Examiner*—Bing Q. Bui
(74) *Attorney, Agent, or Firm*—Oliff & Berridge, PLC

(57) ABSTRACT

The multifunction machine which functions as a telephone terminal equipment requests a connection to an Internet terminal equipment evoked from a transfer operation while the multifunction machine is connected to a telephone terminal equipment. The multifunction machine can be connected to the Internet terminal equipment if this Internet terminal equipment responds to the request. After the multifunction machine is connected to the both terminal equipments, an audio call among three parties; the multifunction machine, the telephone and Internet terminal equipments can be achieved with input/output sound corresponding to audio signals input/output between the multifunction machine and the respective terminal equipments from a telephone transmitter/receiver.

23 Claims, 6 Drawing Sheets

TELEPHONE TERMINAL EQUIPMENT AND TERMINAL CONTROL PROGRAM

BACKGROUND OF THE INVENTION (1) Field of the Invention

This invention relates to a telephone terminal equipment which attains an audio call corresponding to audio signals transferred through one of plural networks including a telephone network and an Internet network.

(2) Background Art

Among present telephone terminal equipments wherein an audio call is held through a telephone network, some telephone terminal equipments comprise a transfer function to attain an audio call between a first and second telephone terminal equipments after invoking the second telephone terminal equipment during an audio call with the first telephone terminal equipment.

Recently, there are telephone terminal equipments which can have audio calls through an Internet network widely available. It can make an audio call more convenient if an audio call is transferable to a telephone terminal equipment connected to an Internet network as well as to a telephone terminal equipment connected to a telephone network with above-mentioned transfer function of known telephone terminal equipments.

This kind of transfer function can be achieved, as the following describes, by changing some parts of the constitution attaining an audio call between a telephone terminal equipment connected to a telephone network and a telephone terminal equipment connected to an Internet network.

One constitution is suggested in Unexamined Japanese Patent Publication No. 7-212494 (in page 5) as an example of the constitution to attain an audio call between a telephone terminal equipment connected to a telephone network and a LAN terminal equipment connected to an Internet network; while a telephone network (a public network) and an Internet network (a LAN network) are connected by a connection control unit, the connection control unit sends a call (a connection request) from a telephone terminal equipment connected to a telephone network to a LAN terminal equipment connected to an Internet network, the connection control unit receives a transfer message from the terminal equipment connected to an Internet network, the terminal equipment to which the call is provided is changed to another terminal equipment required by the transfer message. A transfer from a terminal equipment connected to a telephone network to another terminal equipment connected to an Internet network can be achievable, with the constitution described above, by arranging the connection control unit so that any of these terminal equipments can receive a transfer message during an audio call held between two terminal equipments.

This constitution, however, only attains to switch over lines from the line of a terminal equipment which receives a transfer message to the line of another terminal equipment when a connection control unit receives a transfer message from a terminal equipment. This constitution is not applicable for an audio call among three terminal equipments; another terminal equipment connected to an Internet network is added to an audio call between two terminal equipments.

One of the objects of the present invention is to provide a telephone terminal equipment applicable for an audio call among three terminal equipments by adding another terminal equipment connected to an Internet network to an audio call between two terminal equipments, also to provide a terminal control program applicable for the telephone terminal equipment.

SUMMARY OF THE INVENTION

To attain this and other objects, the telephone terminal equipment comprises a first connection unit that connects a line to another terminal equipment, i.e. a terminal equipment of first party, through one of plural networks including a telephone network and an Internet network, a second connection unit that connects a line to some other terminal equipment, i.e. a terminal equipment of second party while the line to the terminal equipment of first party is connected, if the terminal equipment of second party responds to a call provided by the second connection unit when the second connection unit is provided a command to send a call to the terminal equipment of second party, and an audio relay unit that relays audio signals between the terminal equipments of first and second parties by outputting audio signals input from one of the terminal equipments into the other terminal equipment after the lines to the terminal equipments of first and second parties are connected by the first and second connection units.

According to a telephone terminal equipment constituted as above, while the line to the terminal equipment of first party is connected, by sending a call to a second connection unit, the second connection unit calls the terminal equipment of second party, and if the terminal equipment of second party responds to the call, the line to the terminal equipment of second party can be connected. After the terminal equipment of second party is connected, an audio call among three terminal equipments; the terminal equipment of the present invention, the terminal equipments of first and second parties, can be achieved by inputting/outputting sound corresponding to audio signals input/output to/from the terminal equipment of second party as well as sound corresponding to audio signals input/output to/from the terminal equipment of first party through a telephone transmitter/receiver.

The telephone terminal equipment of the present invention can connect a terminal equipment of first party connected to a telephone network, and a terminal equipment of second party connected to an Internet network. Therefore, the telephone terminal equipment of the present invention can be used for an audio call among three terminal equipments by adding a terminal equipment connected to an Internet network to an audio call between terminal equipments connected through a telephone network.

After terminal equipments of first and second parties are connected by a first and a second connection units, audio signals between the terminal equipments of first and second parties are relayed by an audio relay unit. It is possible to achieve a transfer function to attain an audio call between the terminal equipments of first and second parties after calling the terminal equipment of second party during an audio call between the terminal equipment of the present invention and the terminal equipment of first party.

The first connection unit mentioned above connects the line to the terminal equipment of first party through one of plural networks. For example, the first connection unit connects the line to the terminal equipment of first party when a user execute an operation to respond to an incoming call from the terminal equipment of first party, in another case, when the terminal equipment of first party responds to a call corresponding to a user's operation.

The second connection unit is a unit to connect the line to the terminal equipment of second party through one of the plural networks. The second connection unit connects the line to the terminal equipment of second party while the line to the terminal equipment of first party is connected when the terminal equipment of second party responds to a call provided by the second connection unit corresponding to a command to call the terminal equipment of second party, and the terminal equipment of second party responds to the request. For example, when the second connection unit is provided with a command to call a terminal equipment connected to a telephone network (to call a terminal equipment identified by a telephone number), the second connection unit sets this terminal equipment as a terminal equipment of second party, and call the terminal equipment of second party through the telephone network. For another example, when the second connection unit is provided with a command to call a terminal equipment connected to an Internet network (to call a terminal equipment identified by some identification information such as an IP address or URL (Uniform Resource Locator)), the second connection unit sets this terminal as terminal equipment of second party, and call (request a connection with) the terminal equipment of second party through the Internet network.

A constitution for providing the second connection unit with a command for a call is not specially limited. It can be constituted to provide the second connection unit with a command for a call when, for instance, a user executes an operation to specify the terminal equipment of second party.

More specifically, the second connection unit can be constituted with a designation command unit that requires a specification from a user to specify the terminal equipment of second party, and can be constituted to provide the second connection unit with a command to call the terminal equipment of second party specified by the user, and to send a call to the terminal equipment of second party corresponding to a command sent by the designation command unit while the line to the terminal equipment of first party is connected by the first connection unit.

With a telephone terminal equipment constituted as above, it is possible to provide the second connection unit with a command to call the terminal equipment of second party specified by a user using the designation command unit. The user making an audio call with the terminal equipment of first party using the telephone terminal equipment of the present invention can send a call to the terminal equipment of second party by specifying the terminal equipment of second party with the designation command unit In order to provide the second connection unit with a command for a call as described above, the second connection unit can be constituted so that a command is provided the second connection unit when signals to command to call the terminal equipment of second party are input from the terminal equipment of first party.

More specifically, the second connection unit can be constituted to call the terminal equipment of second party corresponding to command signals input from the terminal equipment of first party to command to call the terminal equipment of second party while the line to the terminal equipment of first party is connected by the first connection unit.

According to a telephone terminal equipment with the constitution described above, it is possible to command from the terminal equipment of first party to the second connection unit to call the terminal equipment of second party provided by command signals. A user of the terminal equipment of first party making an audio call with the telephone terminal equipment of the present invention can have the telephone terminal equipment of the present invention call the terminal equipment of second party by outputting command signals from the terminal equipment of first party to the telephone terminal equipment of the present invention.

The Command signal which is a cue for a call provided to the terminal equipment of second party, only has to be able to identify the terminal equipment of second party to call, but its signal format is not specially limited.

Some type of signals in the same signal format as DTMF (Dual Tone Multi Frequency), for example, can be utilized. Generally, known telephone terminal equipments connected to telephone networks are constituted to output DTMF signals to a telephone network corresponding to a press on a dial button. If the telephone terminal equipment of the present invention can utilize DTMF signals as the command signals, a telephone terminal equipment being unable to output command signals in a specific signals format can provide the second connection unit with a command to call the terminal equipment of second party.

In order to utilize DTMF signals as the command signals, the second connection unit can be constituted to call the terminal equipment of second party corresponding to an input of predetermined DTMF signals from the terminal equipment of first party as command signals while the line to the terminal equipment of first party is connected by the first connection unit.

A telephone terminal equipment constituted as above can have the second connection unit command to call the terminal equipment of second party from a telephone terminal equipment being unable to output command signals in specific signal format because DTMF signals can be utilized as the command signals.

Furthermore, the second connection unit can be constituted to call a terminal equipment identified by the type or the combination of DTMF signals.

According to the telephone terminal equipment constituted as above, the second connection unit determines one of plural terminal equipments as the terminal equipment of second party depending on the type and combination of DTMF signals input from the terminal equipment of first party, and calls the terminal equipment of second party. It enables the user of the terminal equipment of first party who is making an audio call to the telephone terminal equipment of the present invention to have the telephone terminal equipment of the present invention call the terminal equipment of second party desired by the user by outputting some kind or combination of DTMF signals corresponding to the terminal equipment of second party.

The above-mentioned "terminal equipment identified by types of DTMF signals" means terminal equipments of second party corresponding to respective types of DTMF signals when plural terminal equipments of second party are arranged in advance to be corresponding to respective types of DTMF signals.

The above-mentioned "terminal equipment identified by combinations of DTMF signals" means a terminal equipment of second party corresponding to respective combinations of DTMF signals when plural terminal equipments of second party are arranged in advance to be corresponded to respective combinations of DTMF signals. It also means a terminal equipment of second party identified by the combinations of numbers indicated by plural DTMF signals when the terminal equipment of second party is identified by combinations of plural numerals or signs, such as a telephone number or an IP address.

It is possible for above-described telephone terminal equipment to have the terminal equipment of first party provide a command from the telephone terminal equipment of the present invention to call the terminal equipment of second party. By adding to the telephone terminal equipment of the present invention a constitution to connect the telephone line between the telephone terminal equipment of the present invention and the terminal equipment of first party without user's operation, an audio call between the terminal equipments of first and second parties can be achievable without having a user to operate the telephone terminal equipment of the present invention.

A example of specific constitution to connect the line between the telephone terminal equipment of the present invention and the terminal equipment of first party without an user's operation is to have the first connection unit to connect the line to the terminal equipment of first party if a user does not execute an operation to respond to an incoming call from the terminal equipment of first party within predetermined period of time.

According to a telephone terminal equipment constituted as above, the telephone lines between the telephone terminal equipment of the present invention and the terminal equipment of first party are automatically connected even without a user's operation to respond to an incoming call coming into the telephone terminal equipment of the present invention within predetermined period of time.

The above-mentioned telephone terminal equipment further comprises an audio signal output unit to output predetermined audio signals to the terminal equipment of first party until the terminal equipment of second party responds to a call by the second connection unit.

It is possible, with the telephone terminal equipment constituted as above, to output predetermined audio signals to the terminal equipment of first party until the terminal equipment of second party responds to a call from the second connection unit. This enables to confirm in the terminal equipment of first party whether the terminal equipment of second party has responded to the call from the second connection unit by audio signals output from the telephone terminal equipment of the present invention.

The audio signal output unit can be constituted to output audio signals of on-hold tone used when an audio call is placed on hold.

With this constitution, it is possible to confirm in the terminal equipment of first party whether the terminal equipment of second party has responded to a call from the second connection unit of the telephone terminal equipment of the present invention by the on-hold tone (output from a device which functions as a telephone transmitter/receiver).

The audio signal output unit can be constituted to output audio signals indicating that the second connection unit is calling the terminal equipment of second party.

With this constitution, it is possible to confirm in the terminal equipment of first party whether the terminal equipment of second party has responded to a call from the second connection unit of the telephone terminal equipment of the present invention with sound (output from the device which functions as a telephone transmitter/receiver) indicating that the second connection unit is calling the terminal equipment of second party.

In case the first network constituting the connection to the terminal equipment of first party and the second network constituting the connection to the terminal equipment of second party are the same, the audio relay unit mentioned above can be constituted to output the audio signals input from one of the terminal equipments of first and second parties to the other terminal equipment in the same signal format. On the other hand, if the first and the second networks are different, the audio signals input from one of the terminal equipments of first and second parties to the other terminal equipment need to be converted into a signal format transmittable to the network to which the signals are output, and then output to the other terminal equipment.

One constitutional example for converting signal formats is to constitute the audio relay unit to convert audio signals input from the terminal equipment of first party into a format transmittable to the second network, and output the converted audio signals to the terminal equipment of second party through the second network or the otherwise; to convert audio signals input from the terminal equipment of second party into a format transmittable to the first network, and output the converted audio signals to the terminal equipment of first party through the first network when, in both cases, the first network constituting the connection to the terminal equipment of first party and the second network constituting the connection to the terminal equipment of second party are different.

With the telephone terminal equipment constituted as above, audio signals input from one of the terminal equipments of first and second parties can be output to the other terminal equipment after being converted into a signal format transmittable to the network to which the signals are output when the first and second networks are different.

For the audio relay unit mentioned above, the timing for initiating a relay of audio signals is not specially limited. It can be initiated whenever after the first and second connection units respectively connect the lines to the terminal equipments of first and second parties.

The audio relay unit can be constituted to initiate relaying audio signals at the same time when the second connection unit connects the terminal equipment of second party.

The telephone terminal equipment constituted as above can initiate relaying audio signals at the same time when the second connection unit connects the terminal equipment of second party.

Additionally, the audio relay unit can be constituted to initiate relaying audio signals when predetermined conditions for relay initiation are met after the second connection unit connects the line to the terminal equipment of second party.

It is possible with the telephone terminal equipment constituted as above to initiate relaying audio signals when predetermined conditions for relay initiation are met after the second connection unit connects the line to the terminal equipment of second party.

The above-mentioned "conditions for relay initiation" can be met when a user executes predetermined operation.

A relay of audio signals can be initiated when a user executes a predetermined operation after the second connection unit connects the line to the terminal equipment of second party.

The above-mentioned "user's operation" to cue the audio relay unit in initiating relaying audio signals is not limited to a specific operation. It can be, for example, an operation with an operational part (such as a switch) specially placed for initiating a relay of audio signal. A certain operational procedure can be set to initiate an audio signal relay for the "user's operation"; e.g. a long push (to keep pressing for certain period of time) on a certain operational button, or an operation on plural buttons in specific order.

An input of predetermined control signals from one of the terminal equipments of first and second parties can be the "condition for relay initiation" mentioned above.

In this case, the audio relay unit can initiate a relay when predetermined control signals are input after the second connection unit connects the line to the terminal equipment of second party.

The "control signals" to cue the audio relay unit in initiating an audio signal relay can be, for example, DTMF signals.

For utilization of DTMF signals as the control signals, the audio relay unit can be constituted to initiate an audio signal relay when one of the terminal equipments of first and second parties inputs DTMF signals as the control signals when this input is provided to meet the conditions for relay initiation.

The telephone terminal equipment constituted as above can utilize DTMF signals as the control signals, and initiate relaying audio signals with the audio relay unit even from a telephone terminal equipment unable to output control signals in a specific signal format.

Certain types of DTMF signals or certain combination of plural DTMF signals, for example, can be set as the DTMF signals utilized in this constitution. This setting enables an user who is making an audio call between the telephone terminal equipment of the present invention and one of the terminal equipments of first and second parties whichever the user is using to initiate relaying audio signals executed by the audio relay unit of the telephone terminal equipment of the present invention by outputting DTMF signals of certain type or combination from on of the terminal equipments of first and second parties. To initiate a relay of audio signals, the user needs to know that the certain type or combination of DTMF signals is a cue to initiate relaying audio signals. It, thus, can be used for a user anthentification.

As described above, the telephone terminal equipment of the present invention can attain an audio call between the terminal equipments of first and second parties. The connection of the lines to the terminal equipments of first and second parties, however, can be unnecessarily retained even after the audio call between these two terminal equipments is terminated.

For example, after the audio call between the terminal equipments of first and second parties is achieved, an operation to disconnect the lines to these two terminal equipments cannot be executed without a user to operate the telephone terminal equipment of the present invention even after the audio call between the terminal equipment of first and second parties is terminated. The lines to the terminal equipments of first and second parties remain connected unnecessarily.

To avoid unnecessary connection of the lines to the terminal equipments of first and second parties, the telephone terminal equipment of the present invention can comprise a first termination detection unit to detect that the audio call with the terminal equipment of first party is terminated based on the audio signals input from the terminal equipment of first party. With this first termination detection unit, the first connection unit disconnects the line to terminal equipment of first party when the first termination detection unit detects the termination of the audio call, and the second connection unit disconnects the line to terminal equipment of second party when the first termination detection unit detects the termination of the audio call.

With a telephone terminal equipment constituted as above, after the line to the terminal equipment of second party is connected, the first and second connection units can disconnect the lines to the terminal equipments of first and second parties when the first termination detection unit detects the termination of the audio call. This, therefore, prevents a retainment of the connection with the terminal equipment of second party after the termination of the audio call between the terminal equipments of first and second parties.

As for an example of the first termination detection unit to detect a termination of an audio call, the first termination detection unit can be constituted to detect a termination of an audio call by an input of termination signals from the terminal equipment of first party indicating the termination of the audio call.

According to the telephone terminal equipment constituted as above, the first termination detection unit can detect the termination of an audio call by an input of termination signals from the terminal equipment of first party.

There is another way to prevent unnecessary retainment of the line between the terminal equipments of first and second party. The telephone terminal equipment of the present invention can comprise a second termination detection unit to detect the termination of an audio call with the terminal equipment of second party based on audio signals input from the terminal equipment of second party. With the second termination detection unit, the second connection unit disconnects the line to the terminal equipment of second party when the second termination detection unit detects the termination of the audio call, and after the second connection unit connects the line to the terminal equipment of second party, the first connection unit disconnects the line to the terminal equipment of first party when the second termination detection unit detects the termination of the audio call.

After the line to the terminal equipment of second party is connected, the telephone terminal equipment constituted as above can disconnect the line between the terminal equipments of first and second parties with the first and second connection units when the second termination detection unit detects the termination of the audio call. This can prevent retainment of the connection to the terminal equipment of second party after the audio call between the terminal equipments of first and second parties is terminated.

In order for the second termination detection unit to detect a termination of an audio call, the second termination detection unit can be constituted to detect a termination of an audio call by an input of termination signals from the terminal equipment of second party indicating the termination of the audio call.

A telephone terminal equipment constituted as above can detect a termination of an audio call with the second termination detection unit by an input of termination signals from the terminal equipment of second party.

The storage medium for storing the terminal equipment control program of the present invention is a storage medium to execute various procedures to control the telephone terminal equipment which achieves an audio call by inputting/outputting sound corresponding to audio signals transmitted through one of plural networks including a telephone network and an Internet network. The control program comprises a first connection procedure wherein the line to a terminal equipment of an intended party; a terminal equipment of first party is connected through one of plural networks, a second connection procedure wherein the line to a terminal equipment of second party is connected, while the line to the terminal equipment of first party is connected in the first connection procedure, when the terminal equipment of second party responds to a call corresponding to a command to call the terminal equipment of second party which is a different terminal equipment from the terminal equipment of first party, and a audio relay procedure wherein audio signals are relayed between the terminal equipments of first and second parties by outputting the audio signals input from one of the terminal equipments of first and second parties to the other terminal equipment after respective lines to the terminal equipments of first and second parties are connected in the first and second connection procedures.

A computer system controlling a telephone terminal equipment with the program stored in the storage medium described above can constitute some part of above-mentioned telephone terminal equipment. A telephone terminal equipment partly constituted with this computer system can attain the same function and effect as above-mentioned telephone terminal equipment.

The terminal control program described above is provided to a telephone terminal equipment having this program installed, a computer system or a user of these devices through a recording medium such as a FD, CD-ROM or a memory card, or through a communication line network; an Internet, for example. Examples of computer systems to execute these terminal control programs are a computer system installed in an telephone terminal equipment, and a computer system connected to a telephone terminal equipment by a communication path with/without a wire to be capable of data communication.

The audio call method of the present invention comprises these steps; a step of connecting a line to a terminal equipment of first party which is a terminal equipment of an intended party for an audio call through one of the plural networks including a telephone line network and Internet network, a step of connecting a line to a terminal equipment of second party while the line to the terminal equipment of first party is connected when the terminal equipment of second party responds to a call provided through one of the plural networks based on a command to call the terminal equipment of second party which is different from the terminal equipment of first party, and a step of relaying audio signals between the terminal equipments of first and second parties by outputting audio signals input from one of the terminal equipments of first and second parties to the other terminal equipment after the lines to the terminal equipments of first and second parties are connected.

BRIEF DESCRIPTION OF THE DRAWINGS

The invention will now be described below, by way of example, with reference to the accompanying drawings.

DETAILED DESCRIPTION OF THE PREFERRED EMBODIMENT

The below is an example in applying the constitution of the present invention to a multifunction machine 1.

(1) The First Embodiment

Figure 1:
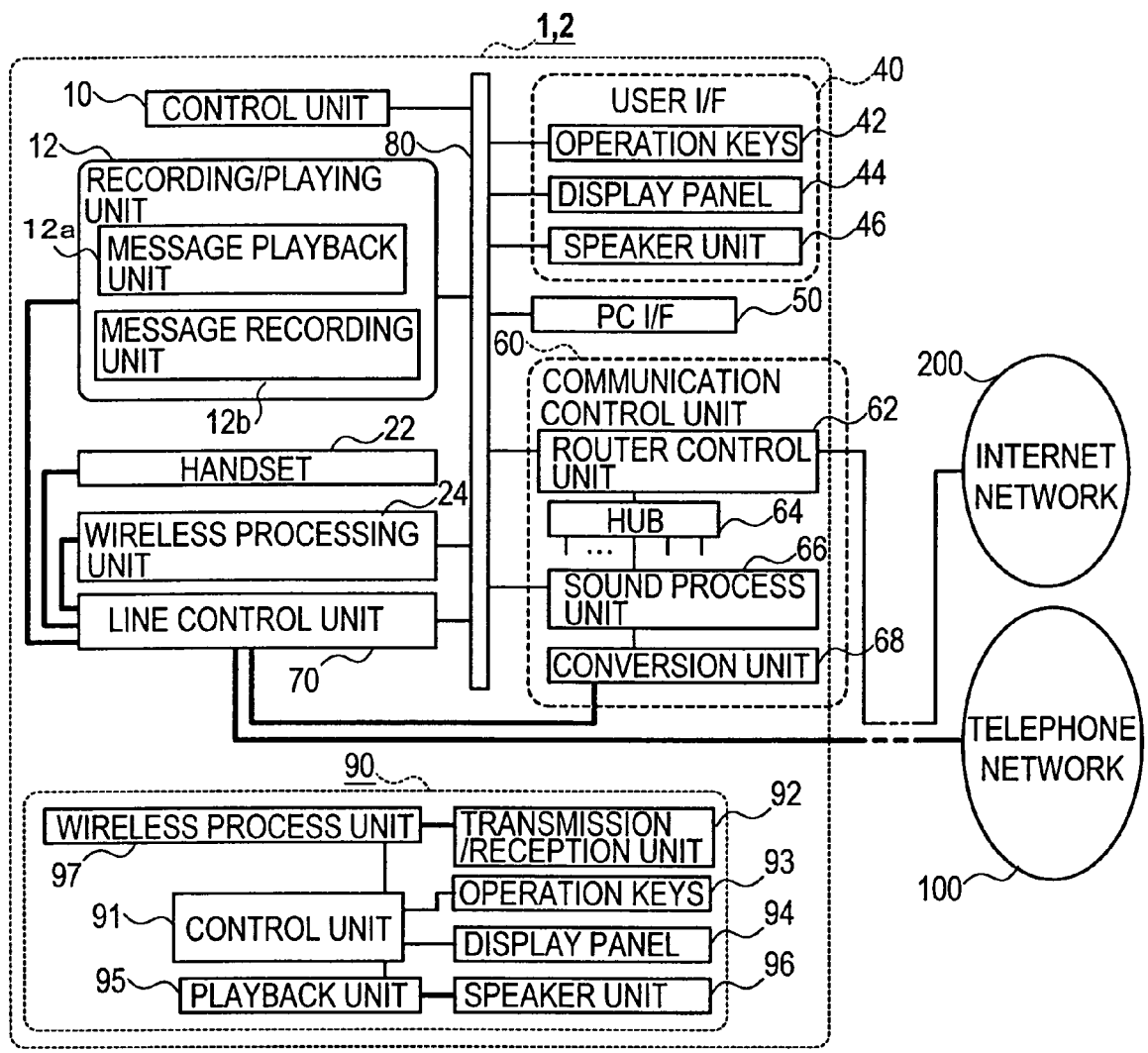
FIG. 1 is a block diagram illustrating the control system of the multifunction machine of the present embodiment.

A multifunction machine 1 has functions to achieve an audio call through a telephone network 100, and to handle data communication through an Internet network 200. As shown in FIG. 1, the multifunction machine 1 comprises a control unit 10, recording/playing unit 12, a handset 22, a wireless processing unit 24, a user interface unit (referred as user I/F in below) 40, a PC interface unit (referred as PC I/F) 50, a communication control unit 60, and a line control unit 70 all connected through a bus 80. The multifunction machine 1 also comprises a cordless handset terminal 90 for wireless communication to communicate wirelessly with the wireless processing unit 24 of the main body of the multifunction machine 1.

The control unit 10 controls operations of entire multifunction machine 1 by providing control signals to each component of the multifunction machine 1 via bus 80 following a processing procedure stored in a memory of the control unit 10.

The recording/playing unit 12 is constituted with a message playback unit 12a to reproduce various audio signals recorded in advance, and a message recording unit 12b to record messages left on an answerphone as audio signals. The message playback unit 12a stores audio signals of ringing tone (sound to indicate that a call request is in progress) used when there is an incoming call, on-hold tone used for placing an audio call on hold, and audio signals of an answering message which indicate an initiation of recording a message with an answerphone function.

The handset 22 is a telephone transmitter/receiver to be detached (i.e. off-hooked) from the multifunction machine 1 when in use.

The wireless processing unit 24 performs a wireless audio call by wirelessly transmitting/receiving various signals including audio signals between the main body of the multifunction machine 1 and the cordless handset terminal 90.

The user I/F 40 comprises operation keys 42, a display panel 44 to display various information, a speaker unit 46 constituted with a speaker and a drive circuit to drive the speaker. The operation keys 42 are constituted with plural number keys, a hold key to initiate/terminate a hold of an audio call, a transfer key used for a transfer in processing a telephone call (refer to FIG. 2) which will be described later in below.

The PC I/F 60 is an interface to connect the multifunction machine 1 with a computer system via a communication cable. The PC I/F 50 enables a data communication between the multifunction machine 1 and the computer system.

The communication control unit 60 comprises a router control unit 62, a hub 64, a sound process unit 66 and a conversion unit 68. The router control unit 62 relays data in packet unit (referred as IP packet in below) from the Internet network 200 to the hub 64 and vice versa; from the hub 64 to the Internet network 200, and functions in the same way as known routers. The hub 64 outputs IP packets input from the router control unit 62 respectively to plural ports, and also outputs IP packets input from plural ports to the router control unit 62. The sound process unit 66 generates audio signals based on the IP packets input from the router control unit 62 through the hub 64, and outputs the audio signals to the conversion unit 68. The sound process unit 66 also generates IP packets based on audio signals input from the conversion unit 68, and outputs the IP packets to the router control unit 62 through the hub 64. The conversion unit 68 implements a digital-analog conversion of audio signals input from the sound process unit 66, outputs the audio signals to the line control unit 70, likewise implements an analog-digital conversion of audio signals input from the line control unit 70 and outputs the signals to the audio process unit 66. The multifunction machine 1 achieves an audio call through the Internet network 200 by outputting the audio signals input from the Internet network 200 as an IP packet from a telephone transmitter/receiver through the line control unit 70 as sound, or outputting the audio signals input from the telephone transmitter/receiver as sound from the communication control unit 60 through the line control unit 70 as an IP packet. The function to achieve an audio call through the Internet network 200 is going to be referred in below as an Internet communication function.

The line control unit 70 inputs/outputs audio signals from/to the outside of the multifunction machine 1, and sets transmission paths between a transmission source of the audio signals input/output from/to outside of the multifunction machine 1 and a transmission destination, and transmission paths for inputting/outputting the audio signals from/to outside of the multifunction machine 1.

The "transmission paths between a transmission source of the audio signals input/output from/to outside of the multifunction machine 1, and a transmission destination" become capable of transmitting audio signals when an operation is executed to initiate an audio call (referred as an off-hook operation in below) on one of the components which function as telephone transmitters/receivers (the handset 22 and cordless handset terminal 90; referred as telephone transmitter/receiver in below), and this operation sets a path from the line control unit 70 to one of the telephone transmitters/receivers on which the off-hook operation was executed as the transmission path described above. Specifically, when the handset 22 is detached (off-hooked) from the main body of the multifunction machine 1, the path from the line control unit 70 to the handset 22 is set as the transmission path described above. When an off-hook operation (done by pressing on a call initiation key which will be explained later) is executed on the cordless handset terminal 90, the path from the line control unit 70 to the cordless handset terminal 90 is set as the transmission path. The transmission path set as above is reset when an operation to terminate an audio call (referred as an on-hook operation in below) is executed by one of the telephone transmitters/receivers, and becomes incapable of transmitting audio signals. Specially, the transmission path is reset when the handset 22 is replaced on the main body of the multifunction machine 1, or when the on-hook operation (done by pressing on a call termination key which will be explained later) is executed by the cordless handset terminal 90.

"The transmission path for inputting/outputting the audio signals from/to outside of the multifunction machine 1." is originally set on the path from the line control unit 70 to the telephone network 100. The path can input/output the audio signals from/to outside through the telephone network 100. However, when an operation to request to connect the line to the Internet terminal equipment (referred as an Internet call operation) is executed by specifying the IP address of the Internet terminal which is to be the intended party of the audio call after an off-hook operation, or when an off-hook operation is executed after receiving an incoming call (signals to request a connection with the multifunction machine 1) from the Internet network 200 (the communication control unit 60), the path from the line control unit 70 to the communication control unit 60 (thus Internet network 200) is set as the transmission path and becomes capable of transmitting the audio signals. Once the communication control unit 60 is set as one end of the transmission path, the path from the line control unit 70 to the communication control unit 60 is set whenever an on-hook operation is executed.

The cordless handset terminal comprises a control unit 91 to control the entire operation of the cordless handset terminal, a transmission/reception unit 92 constituted with a speaker, a microphone and a drive circuit to drive the speaker and the microphone, operation keys 93 constituted with plural keys, a display panel to display various information, a playback unit 95 to play various audio signals recorded in advance, a speaker unit 96 constituted with a speaker to output sound corresponding to the audio signals played by the playback unit 95 and a drive circuit to drive the speaker, and a wireless process unit 97 to transmit/receive wirelessly various signals including audio signals between the wireless process unit 24 of the main body of the multifunction machine 1 and the cordless handset terminal 90. The operation keys 93 of the cordless handset terminal 90 are constituted with a call initiation key to initiate an audio call, a call termination key to terminate an audio call, a hold key to initiate/terminate an audio call on hold, and a transfer key to transfer an audio call in a call process (illustrated in FIG. 2) which will be explained later. In the playback unit 95, a ringing tone for receiving an incoming call and audio signals, such as on-hold tone, used when an audio call is placed on hold. The cordless handset terminal 90 is constituted to send various commands indicating descriptions of operations to (the wireless process unit 24 of) the main body of the multifunction machine 1 when the operation keys are operated. (The control unit 10 of) the multifunction machine 1 receiving a command can detect an operation on the operation keys 93 of the cordless handset terminal 90, and interpret the description of the operation.

In the multifunction machine 1, for one part of the transmission path from the communication control unit 60 to the Internet network 200 (the part from user's side to a telephone exchange station), the telephone line which connects the line control unit 70 with the telephone network 100 is shared. In this part, signals transmitted through the telephone like network 100 by ADSL (Asymmetric Digital Subscriber Line) technology and an IP packet transmitted through the Internet network 200 are overlapped and transmitted. Detailed explanation in this regard, however, is not repeated here.

Procedures of the call process executed by the control unit 60 of the multifunction machine 1 will be explained in the following based on the FIG. 2. After the multifunction machine 1 is activated (the power is on), this call process is repeatedly executed until the multifunction machine 1 is activated (the power is off).

First, the control unit 10 determines whether or not the multifunction machine 1 has received an incoming call from a telephone terminal equipment (e.g. the telephone terminal equipment A in FIG. 3) through the telephone network 100 (S110).

When it is determined that the multifunction machine 1 has received an incoming call (S110: YES), the control unit 10 initiates outputting the ringing tone (S120). In this step, the control signals to initiate playing the ringing tone are output to the recording/playing unit 12. The massage play unit 12a of the recording/playing unit 12 in which the control signals are input initiates playing the ringing tone. The audio signals of the ringing tone are repeatedly output to the user I/F 40, and then, the speaker unit 46 of the user I/F 40 initiates outputting the ringing tone. In S120, the control signals to initiate playing the ringing tone are transmitted to the cordless handset terminal 90 through the wireless process unit 24. When the cordless handset terminal 90 receives the control signals, the cordless handset terminal 90 initiates playing the ringing tone with the playback unit 95, also outputs the ringing tone from the speaker unit 96.

Subsequently, the control unit 10 determines whether or not any of the transmitters/receivers has executed an off-hook operation (S130).

When it is determined that there isn't any off-hook operation executed (S130: NO), the control unit 10 determines whether or not the incoming call received in S110 is continuing (S140). When it is determined that the call is still continuing (S140: YES), the process goes back to the S130.

In S140, when it is determined that the incoming call is not continuing (S140: NO), the control unit 10 terminates outputting the ringing tone (S150). In this step, the control signals to terminate the ringing tone are output to the recording/playing unit 12. The recording/playing unit 12 which receives the control signals terminates the ringing tone played by the massage playback unit 12a. This terminates outputting the ringing tone from the speaker unit 46 of the user I/F 40. In S120, the control signals to terminate playing the ringing tone are also transmitted to the cordless handset terminal 90 through the wireless process unit 24. The cordless handset terminal 90 which receives these control signals terminates outputting the ringing tone played by the playback unit 95.

After the process in S150, the process goes back to S100.

In S130, if it is determined that there is an off-hook operation executed (S130: YES), the control unit 10 terminates outputting the ringing tone (S160). The process for the termination is the same as the process in S150.

In S170, the control unit 10 sets the path from one of the telephone transmitters/receivers on which the off-hook operation is executed in S130 to the line control unit 70 as a transmission paths between a transmission source of the audio signals input/output from/to outside of the multifunction machine 1, and a transmission destination, and connects the lines between the multifunction machine 1 and the telephone terminal equipment A. In this step, the control signals to set the path from one of the telephone transmitters/receivers on which the off-hook operation is executed in S130 to the line control unit 70 as the transmission path, described above, to the line control unit 70. The line control unit 70 which receives the control signals sets the path from one of the telephone transmitters/receivers to the line control unit 70 as the transmission path described above, and enables this path to input/output the audio signals input/output from/to the outside of the multifunction machine 1. In S170, the transmission path is formed from the multifunction machine 1 to the telephone terminal equipment A by having the set transmission path connected with the telephone network 100. This formation of the transmission path connects the line between the multifunction machine 1 and the telephone terminal equipment A. An audio call between the multifunction machine 1 and the telephone terminal equipment is, then, initiated.

In S110, if it is determined that there isn't any incoming call through the telephone network 100 (S110: NO), the control unit 10 determines whether or not an operation for telephone call is executed (S180). The "operation for calling a telephone" is an operation to specify a telephone terminal equipment to be called for through the telephone network 100 (e.g. the telephone terminal equipment A in FIG. 3), and can be executed by inputting the telephone number of the telephone terminal equipment A with the operation keys 42 of the user I/F 40 following an off-hook operation on the handset 22, or inputting the telephone number of the telephone terminal equipment A with the operation keys 93 of the cordless handset terminal 90 following an off-hook operation on the cordless handset terminal 90.

In S180, if it is determined that there isn't any operation executed for calling a telephone (S180: NO), the process goes back to S110.

On the other hand, if it is determined that there is an operation executed for telephone call (S180: YES), the control unit 10 calls the telephone terminal equipment A specified by this operation for calling a telephone (S190). In S190, the call request is conducted by outputting command signals to call the telephone number specified in S180 (selection signals).

In S200, the control unit 10 sets the path from one of the telephone transmitters/receivers on which an operation for calling a telephone is executed in S180 to the line control unit 70 as the transmission paths between a transmission source of the audio signals input/output from/to outside of the multifunction machine 1, and a transmission destination, and connects the line between the multifunction machine 1 and the telephone terminal equipment A. In this step, the control signals to set the path from one of the telephone transmitters/receivers on which an operation for telephone call is executed in S180 to the line control unit 70 as the transmission path described above are output to the line control unit 70. The line control unit 70 which receives the control signals sets the path from the telephone transmitter/receiver to the line control unit 70 as the transmission path described above, and enables the path to input/output the audio signals input/output from/to the outside of the multifunction machine 1. In S200, a transmission path from the multifunction machine 1 to the nearest telephone exchange to the telephone terminal equipment A is formed by having the set transmission path connected to the telephone network 100. The formation of the transmission path facilitates the line between the multifunction machine 1 and the nearest telephone exchange to the telephone terminal equipment A. In later step (S210), the line between the multifunction machine 1 and the telephone terminal equipment A are connected in the same manner as in S170, if the telephone terminal equipment A responds to the call in S190.

Next, the control unit 10 determines whether or not the telephone terminal equipment A responds to the call in S190 (S210).

If it is determined that the telephone terminal equipment A does not respond to the call (S210: NO), the process goes back to S210 in case there is no on-hook operation (S220: NO).

In S220, if it is determined that there is an on-hook operation (S220: YES), the control unit 10 resets the transmission path set in S200, and disconnects the lines between the multifunction machine 1 and the telephone terminal equipment A (S230). In this step, control signals to reset the transmission path set in S200 are output to the line control unit 70. The line control unit 70 which receives the control signals resets the setting on the path from one of the telephone transmitters/receivers to the line control unit 70, and disables the path to input/output audio signals input/output from/to the outside of the multifunction machine 1. In S230, corresponding to the reset on the transmission path, the transmission path is disconnected from the telephone network 100. This opens the transmission path between the multifunction machine 1 and the nearest telephone exchange to the telephone terminal equipment A; the line between the multifunction machine 1 and the nearest telephone exchange to the telephone terminal equipment A is disconnected.

After the process in S230, the process goes back to S110.

In S210, if it is determined that the telephone terminal equipment A responds to the call (210: YES), the line between the multifunction machine 1 and the telephone terminal equipment A is connected, and an audio call between these terminal equipments can be initiated.

After the process in S170, or if it is determined that the telephone terminal equipment A responds to the call (S210: YES), the control unit 10 determines whether or not a transfer operation to transfer the audio call is executed (S240). This "transfer operation" is an operation for transferring the audio call to an Internet terminal equipment connected to the Internet network 200 (e.g. the multifunction machine B (constituted the same as the multifunction machine 1, referred as the Internet terminal equipment in below) in FIG. 3). In the present embodiment, the transfer operation is done by pressing one of the transfer keys constituting the operation keys 42 or 98 of the one of the telephone transmitters/receivers set in S170 or S200, and then call the Internet terminal equipment with number keys constituting the operation keys 42 or 93. In S240, the control unit 10 checks if signals corresponding to the transfer operation (command signals) are input from the operation keys 42 or 93.

In this step, if it is determined that a transfer operation is executed (S240: NO), the control unit 10 determines whether or not an on-hook operation is executed (S250). If it is determined that there is no on-hook operation (S250: NO), the process goes back to S240.

To the contrary, if it is determined that an on-hook operation is executed (S250: YES), the control unit 10 resets the transmission path set with the process of S170, and disconnects the line between the multifunction machine 1 and the telephone terminal equipment A (S260). In S260, the control signals to reset the transmission path set with the process of S170 are output to the line control unit 70. The line control unit 70 which receives these control signals resets the setting on the path from one of the telephone transmitters/receivers to the line control unit 70, and disables the path to input/output audio signals input/output from/to the outside of the multifunction machine 1. In S260, corresponding to the reset of the transmission path, the transmission path is disconnected from the telephone line network 100. This opens the transmission path between the multifunction machine 1 and the nearest telephone exchange to the telephone terminal equipment A, and disconnects the line between the multifunction machine 1 and the nearest telephone exchange to the telephone terminal equipment A.

After the process in S260, the process goes back to S110.

In S240, if it is determined that a transfer operation is executed (S240: YES), the control unit 10 requests a connection to the Internet terminal equipment B with the IP address specified by (the operation for calling the Internet terminal equipment of) the transfer operation (S270). In S270, an input/output of various signals are initiated between the multifunction machine 1 and the Internet terminal equipment B in order to connect the line (establish a connection) to the Internet terminal equipment B with the IP address specified by the transfer operation. The multifunction machine 1 is connected to the Internet terminal equipment B by a response of the Internet terminal equipment B to the call in S270 (a termination of input/output of various signals in S270). An audio call between these two terminal equipments is initiated.

In S280, the control unit 10 determines whether or not the Internet terminal equipment B responds to the request sent in S270.

If it is determined that the Internet terminal equipment B does not respond to the request (S280: NO), the control unit 10 determines whether or not an operation for a transfer cancellation is executed (S290).

The "operation for transfer cancellation" is an operation to cancel transferring the audio call. In the present embodiment this operation is done by pressing the transfer key of the operation keys 42 or 98 of one of the telephone transmitters/receivers for the second time after the process of S240.

If it is determined that an operation for a transfer cancellation is executed (S290: YES), the control unit 10 cancels the request for connection sent in S270 (S300), and then the process goes back to S240. In S300, the request for a connection is cancelled by terminating the input/output of the various signals initiated in S270 from/to the Internet terminal equipment B.

Contrary, if it is determined that no operation for a transfer cancellation is executed (S290: NO), the process goes back to S280.

In S280, if it is determined that the Internet terminal equipment B responds to the connection request (S280: YES), the control unit 10 not only maintains the connection with the telephone terminal equipment A, but also connects the line to the Internet terminal equipment B (S310). In S310, control signals are output to the line control unit 70 to set the path between the line control unit 70 and the Internet network 200 (i.e. the communication control unit 60) as the transmission path to input/output audio signals from/to the outside of the multifunction machine 1 as well as the path between the line control unit 70 and the telephone network 100. The line control unit 70 which receives the control signals sets the path between the telephone network 100 and the line control unit 70, and the path between the communication control unit 60 and the line control unit 70 as the transmission paths described above, and enables these paths to input/output audio signals from/to the outside of the multifunction machine 1 individually. Corresponding to the respective establishments of connections of the transmission paths set in S170 or S200 to the telephone network 100 and the communication control unit 60, the transmission path between the multifunction machine 1 and the Internet terminal equipment B is formed (connection is established) while having the formation of the transmission path between the multifunction machine 1 and the Internet terminal equipment B still maintained, and then the line between the multifunction machine 1 and the Internet terminal equipment B is connected. This initiates an audio call between the multifunction machine 1 and the Internet terminal equipment B as well as an audio call between the multifunction machine 1 and the telephone terminal equipment A; an audio call among three parties, the multifunction machine 1 with the two terminal equipments A and B, are initiated.

In the next step, the control unit 10 stands by until there is an on-hook operation (S320: NO).

In S320, if it is determined that an on-hook operation is executed (S320: YES), the control unit 10 initiates relaying audio signals (S330). For this process, control signals to initiate relaying audio signals are output to the line control unit 70. The line control unit 70 which receives the control signals initiates relaying audio signals. Specifically, after receiving the control signals, the line control unit 70 outputs audio signals input from the first path; between the telephone network 100 and the line control unit 70, to the second path; between the communication control unit 60 and the line control unit 70, and outputs audio signals input from the second path to the first path, then initiates relaying audio signals between the telephone terminal equipment A and the Internet terminal equipment B. Consequently, a transfer of audio signals is executed through the multifunction machine 1.

In S340, the control unit 10 disables the telephone transmitter/receiver to input/output audio signals input/output from/to the outside of the multifunction machine 1. For this process, in the same way as the process in S230, control signals to reset the transmission path set in S170 or S200 are output to the line control unit 70. The line control unit 70 which receives the control signals resets the path between the telephone transmitter/receiver and the line control unit 70, and disables the path to input/output audio signals input/output from/to the outside of the multifunction machine 1. In this process, however, the transmission path between the multifunction machine 1 and the Internet terminal equipment B is not opened; the path is still connected to the line control unit 70. Therefore, the lines between the multifunction machine 1 and the two terminal equipments are kept connected.

In S350, the control unit 10 stands by until it detects a termination of an audio call between the telephone terminal equipment A and the Internet terminal equipment B (S350: NO). In this process, a termination of the audio call between the two terminal equipments is detected when termination signals (busy tone) to indicate disconnection with the multifunction machine 1 are input from the telephone network 100. Generally, in an audio call through the telephone network 100, busy tone is output from the nearest telephone exchange to the telephone terminal equipment A after an operation to disconnect the line between the telephone terminal equipment A and the multifunction machine 1 is executed. The input of the busy tone from the telephone network 100, hence, can indicate the termination of the audio call between the telephone terminal equipment A and the Internet terminal equipment B. After inputting the busy tone from the telephone network 100, the multifunction machine 1 is open in its line to the telephone exchange.

In S350, if it is determined that the control unit 10 detects the termination of the audio call between the telephone terminal equipment A and the Internet terminal equipment B (S350: YES), the control unit 10 respectively disconnects lines between the multifunction machine 1 and the telephone terminal equipment A and between the multifunction machine 1 and the Internet terminal equipment B (S360). In this process, opening the line to the nearest telephone exchange to the telephone terminal equipment A disconnects the line to the telephone exchange. After various signals to disconnect the line to the Internet terminal equipment B (disengagement of the connection) are input/output, the line to the Internet terminal equipment B is disconnected.

After the process of S360, the process goes back to silo.

Separately from processing the audio call described above, the control unit 10 can also process a second audio call wherein the line to the telephone terminal equipment A is connected through the telephone network 100 after it is connected to the Internet terminal equipment B. The detailed descriptions of this process are omitted here, because the are almost the same except for the points that some replacements are required; the descriptions regarding to the telephone network 100 and the telephone terminal equipment A need to be replaced with the description of the Internet network 200 and the Internet terminal equipment B, and the descriptions regarding to the Internet network 200 and the Internet terminal equipment B need to be replaced with the description of the telephone network 100 and the telephone terminal equipment A.

Figure 3:
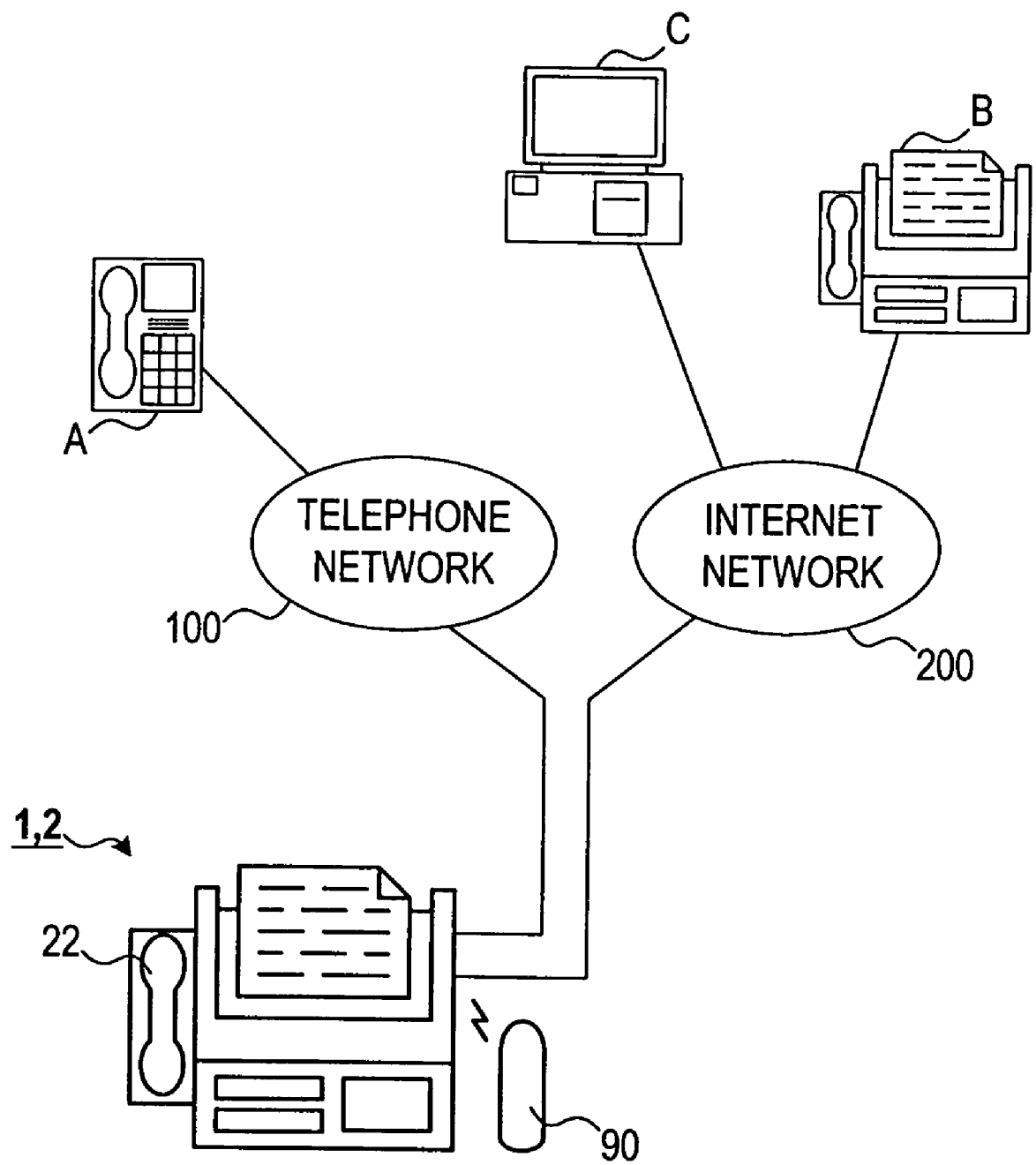
FIG. 3 is an explanatory diagram illustrating the network constitution of the present embodiment.

The control unit 10 can furthermore process a third audio call wherein the line to another Internet terminal equipment (e.g. the personal computer (referred as an Internet terminal equipment in below) in FIG. 3) is connected separately from the two audio calls described above after the line to the Internet terminal equipment B is connected. The descriptions of the processes are almost the same as described above. It is necessary only to replace the parts related to the telephone network 100 and the telephone terminal equipment A to the Internet network 200 and the Internet terminal equipment B, and the parts related to the Internet terminal equipment B to the Internet terminal equipment C. The control unit 10, in this case, detects a termination of an audio call between the Internet terminal equipment B and the Internet terminal equipment C by a input of various signals to disconnect the line between the Internet network 200 and the multifunction machine 1 (disengagement of the connection) in S350. Detailed explanation on this process is omitted here.

(2) The Effect of the First Embodiment

According to the multifunction machine constituted as above, while the line to the telephone terminal equipment A or the Internet terminal equipment B (referred as the terminal equipment of first party in below) is connected by the process in S170 in FIG. 2, a transfer operation in the process of S240 provides a request for connection (or a call) to the Internet terminal equipment B, the telephone terminal equipment A or the Internet terminal equipment C (referred as the terminal equipment of second party in below) in S270. If the terminal equipment of second party responds to the request (or call) (the process of S280), the line to the terminal equipment of second party is also connected. After the line to the terminal equipment of second party is connected, the telephone transmitter/receiver becomes capable of inputting/outputting sound corresponding not only to the audio signals input/output from/to the terminal equipment of first party, but to the audio signals input/output from/to the terminal equipment of second party. This attains an audio call among three parties; the multifunction machine 1, the terminal equipment of first party and the terminal equipment of second party. Therefore, this is applicable to an audio call among three parties by bringing the Internet terminal equipment B connected to the Internet network 200 into an audio call with the telephone terminal equipment A connected to the telephone network 100.

Figure 2:
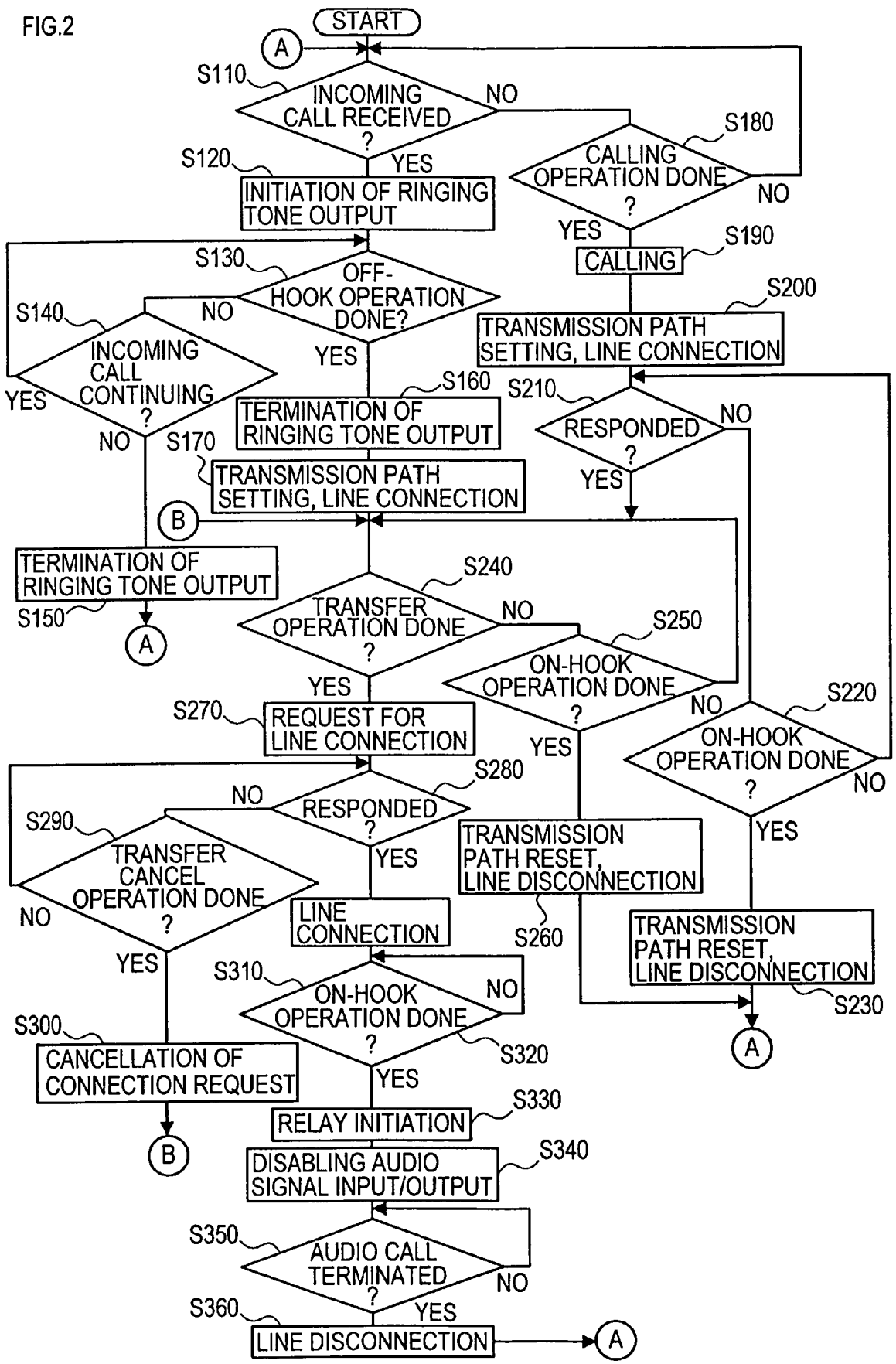
FIG. 2 is a flowchart indicating the procedure of the audio process in the first embodiment.

After the lines to the terminal equipments of first and second parties are connected respectively by the process of S310 in FIG. 2, the process of S330 executes a relay of audio signals between the two terminal equipments. A transfer function wherein an audio call is achievable between the terminal equipments of first and second parties after calling the terminal equipment of second party during an audio call with the terminal equipment of first party can be attained.

In S240 of FIG. 2, a user can provide the multifunction machine 1 (the control unit 10) with a command to call the terminal equipment of second party by specifying the terminal equipment of second party with the transfer operation. The user of the multifunction machine 1 making an audio call with the terminal equipment of first party can have the multifunction machine 1 request a connection of the line between the terminal equipment of second party and the multifunction machine 1 (or command the multifunction machine 1 to call the terminal equipment of second party) by specifying the terminal equipment of second party with the transfer operation.

During the audio signals being relayed in S330 of FIG. 2, audio signals input in the first path; between the telephone network 100 and the line control unit 70 are output to the second path; between the communication control unit 60 and the line control unit 70, and audio signals input in the second path are output to the first path. The audio signals input from the first path are converted into data in packet by the communication control unit 60, and then output to the Internet network 200. Audio signals converted into data in packet are input from the Internet network 200. The communication control unit 60 converts the data into audio signals and outputs them into the second path. In case of relaying audio signals between the telephone terminal equipment A (or the Internet terminal equipment B) and the Internet terminal equipment B (or the telephone terminal equipment A), audio signals input from one of the terminal equipments are converted into a signal format transmittable to the network to which the audio signals are output, and then output to the other terminal equipment.

After the line to the terminal equipment of first party is connected by the process of S170 in FIG. 2, when the condition (condition for relay initiation); execution of an on-hook operation is met in S320, a relay of audio signals is initiated in S330.

After the respective lines to the terminal equipments of first and second parties are connected in S310, when a termination of the audio call between the two terminal equipments is detected at S350, the lines to the both terminal equipments are disconnected by the process of S360. Hence, after the audio call between the terminal equipments of first and second parties is initiated, retainment of the connections with both terminal equipments can be avoided even if the audio call is terminated without any user operating the multifunction machine 1.

In S350, the termination of the audio call between two terminal equipments can be detected by an input of termination signals (busy tone) indicating disconnection of the line to the multifunction machine 1, also by an input of various signals to disconnect the line (disengage the connection) to the multifunction machine 1 from the Internet network 200 (the Internet terminal equipment B or C).

(3) The Second Embodiment

A multifunction machine 2 is constituted in the same way as the multifunction machine 1 described in the first embodiment. Some part of the process differs from the process of the multifunction machine 1. Only the differences are going to be explained in the following sections.

The procedure of the audio call process executed by the control unit 10 of the multifunction machine 2 is explained in below based on FIG. 4. After the multifunction machine 2 is activated (power is ON), these processes are repeated until it is deactivated (power is OFF).

The control unit 10 stands by until it receives an incoming call from a telephone terminal equipment (e.g. the telephone terminal equipment A in FIG. 3) through the telephone network 100 (S410: NO).

When it is determined that the control unit 10 receives an incoming call from the telephone terminal equipment A (S410: YES), the control unit 10 initiates outputting the ringing tone (S420). This process is executed in the same manner as the process in S120 of FIG. 2; the ringing tone is output from the speaker unit 46 of the user I/F 40 and the playback unit 95 of the cordless handset terminal 90. Count of the number of the ringing tone output from the user I/F 40 is initiated in this step.

The control unit 10 determines whether or not the number of output of the ringing tone initiated counting in S420 has reached to a predetermined number (5 times in the preset embodiment) (S430).

If it is determined that the number of output of the ringing tone has not yet reached to the predetermined number (S430: NO), the control unit 10 determines whether or not the incoming call received in S410 is continuing (S440), if it is continuing (S440: YES), the process goes back to S430. In S440, the control unit 10 can execute some other process such as determining whether or not the user of the multifunction machine 2 has done an on-hook operation while the incoming call received in S410 is still continuing. This kind of process, however, is the same as the processes after S130 in FIG. 2 of the first embodiment. Hence, the description of this matter in the second embodiment is not repeated.

On the other hand, if it is determined that the incoming call is no longer continuing (S440: NO), the control unit 10 terminates outputting the ringing tone (S450). This process takes place in the same manner as the processes of S150 and S160 in FIG. 2; the output of the ringing tone from the speaker unit 46 of the user I/F 40 and the playback unit 95 of the cordless handset terminal 90 is terminated.

The process goes back to S410 after completing the process of S450.

In S430, if it is determined that the number of output of the ringing tone has reached to the predetermined number (S430: YES), the control unit 10 terminates the output of the ringing tone (S460). This process is the same as the process of S450.

The control unit 10 commands the line control unit 70 to set the path between the recording/playing unit 12 and the line control unit 70 as a transmission path to input/output audio signals from/to the outside of the multifunction machine 2, and connects the line between the multifunction machine 2 and the telephone terminal equipment A (S470). In this process, control signals to set the path between the recording/playing unit 12 and the line control unit 70 as the transmission path described above are output to the line control unit 70. The line control unit 70 which receives the control signals sets the path between the recording/playing unit 12 and the line control unit 70, and enables the path to input/output audio signals input/output from/to the outside of the multifunction machine 2. In S470, connecting the set transmission path to the telephone network 100 form a transmission path between the multifunction machine 2 and the telephone terminal equipment A, and connects the line between the multifunction machine 2 and the telephone terminal equipment A.

In the next step, the control unit 10 initiates a response with an answerphone (S480). This "response with an answerphone" is to output audio signals corresponding to an answering message through the telephone network 100 to the telephone terminal equipment A from the message playback unit 12a of the recording/playing unit 12 to play the answering message, and to record the audio signals input from the telephone terminal equipment A through the telephone network 100 in the message recording unit 12b after the audio signals are output. In S480, control signals to initiate this response are output to the recording/playing unit 12, and the recording/playing unit 12 which receives the control signals initiate the response with the answerphone.

The control unit 10 determines whether or not the multifunction machine 2 has received a transfer command from the telephone terminal equipment A (S490). The "transfer command" means to command a transfer of the audio call to an Internet terminal equipment (e.g. the multifunction machine B (constituted in the same way as the multifunction machine 2, referred as an Internet terminal equipment in below) in FIG. 3), and can be provided by external DTMF signals. Specifically, the transfer command can be provided by continuous output of plural DTMF signals corresponding to respective numbers constituting the IP address of the Internet terminal equipment B with the user's operation; by pressing dial buttons, for example, on the telephone terminal equipment A. Suppose if the IP address of the Internet terminal equipment B is "XX. XX. XX. XX (X is a given number)" in decimal notation of IPv4 (Internet Protocol Version 4), the user of the telephone terminal equipment A can specify the Internet terminal equipment B by pressing on respective number dial button for each number "X", and the "*" button for ".". This operation can provide a command the complex terminal equipment 2 to transfer the audio call from the telephone terminal equipment A to the Internet terminal equipment. In S490, it is determined whether plural DTMF signals with combinations corresponding to the IP address are input as signals for transfer command (command signals) from the telephone terminal equipment A through the telephone network 100.

If it is determined that the control unit 10 does not receive the transfer command (S490: NO), the process goes back to S490 if the answerphone has not terminated its response (S500: NO). If it is determined that the answerphone has terminated its response (S500: YES), the control unit 10 resets the transmission path set in S470 and disconnects the line between the multifunction machine 2 and the telephone terminal equipment A (S510). In this process, the control signals to reset the transmission path set in S470 are output to the line control unit 70. The line control unit 70 which receives the control signals resets the path between the recording/playing unit 12 and the line control unit, and disables audio signals input/output from/to the outside of the multifunction machine 2 to be input/output into this path. In S510, corresponding to getting reset, the transmission path gets disconnected from the telephone network 100. This opens the transmission path between the multifunction machine 2 and the telephone terminal equipment A, and disconnects the line between the multifunction machine 2 and the telephone terminal equipment A.

After the process in S510, the process goes back to S410.

If it is determined that the control unit 10 receives the transfer command in S490 (S490: YES), the control unit 10 terminates the response of the answerphone initiated in S480 (S520). In this process, control signals are output to the recording/playing unit 12 to terminate the response of the answerphone initiated in S480. The recording/playing unit 12 which receives the control signals terminates the response of the answerphone.

The control unit 10, then, resets the transmission path set in S470 (S530). As well as the process of S510, control signals to reset the transmission path set in S470 are provided to the line control unit 70 in this process. The line control unit 70 which receives the control signals resets the path between the recording/playing uni12 and the line control unit 70, and disables audio signals input/output from/to the outside of the multifunction machine 2 to be input/output into the path. However, in S530, the transmission path between the multifunction machine 2 and the telephone terminal equipment A is not opened. The line between the multifunction machine 2 and the telephone terminal equipment A, thus, remain connected.

In S540, the control unit 10 requires a connection to the Internet terminal equipment B specified by the transfer command in S490. Input/output of various signals are initiated in this process to connect the line (to establish a connection) to the Internet terminal equipment B with the IP address specified by the transfer command. The multifunction machine 2 is connected to the Internet terminal equipment B by a response of the Internet terminal equipment B to the request in S510 (a termination of the input/output of the various signals), and an audio call between the multifunction machine 2 and the Internet terminal equipment B is initiated.

In S550, the control unit 10 starts the timer.

The control unit 10 determines whether or not the Internet terminal equipment B has responded to the request provided in S540 (S560).

If it is determined that the Internet terminal equipment B has not responded to the request (S560: NO), the process goes back to S560. If the counter value t1 has not yet reached to the predetermined time t0 (10 seconds in the present embodiment) (S570: NO).

If it is determined that the counter value t1 has reached to the predetermined time to (t0≦t1) (S570: YES), the process goes back to S410, after the control unit 10 stops and resets the timer (S580).

If it is determined that the Internet terminal equipment B has responded to the request (S560: YES), the control unit 10 stops and resets the timer (S590), then initiates relaying audio signals (S600). In this process, the same processes take place as in S330 of FIG. 2; relaying audio signals between the telephone terminal equipment A and the Internet terminal equipment B is initiated, and transferring the audio call takes place through the multifunction machine 2. After these conditions are met, an audio call can be attained among three parties; the multifunction machine 2, the telephone terminal equipment A and the Internet terminal equipment B by inputting/outputting sound corresponding not only to the audio signals input/output from/to the telephone terminal equipment A, but also to the audio signals input/output from/to the Internet terminal equipment B through the telephone transmitter/receiver.

In the next step, the control unit 10 stands by until it detects a termination of the audio call between the telephone terminal equipment A and the Internet terminal equipment B (S610: NO). The control unit 10 stands by until it is provided with termination signals (busy tone) from the telephone network 100. After the busy tone is input from the telephone network 100, the line between the multifunction machine 2 and a telephone exchange opens.

In S610, when it is determined that the control unit 10 detects the termination of the audio call between the telephone terminal equipment A and the Internet terminal equipment B (S610: YES), it disconnects the respective lines of the telephone terminal equipment A and the Internet terminal equipment B (S620). Similarly to the process of S360 in FIG. 2, the line to the nearest telephone exchange to the telephone terminal equipment A gets disconnected, and so does the line to the Internet terminal equipment B.

After the process of S620, the process goes back to S410.

The control unit 10 is capable of, other than processing the audio call described above, processing a second call wherein the line to the telephone terminal equipment A gets connected through the telephone network 100 after the line to the Internet terminal equipment B gets connected, if the Internet terminal equipment 13 is capable of outputting DTMF signals to the multifunction machine 2 through the Internet network 200. The processes, however, are almost the same, except it requires replacements in the parts relating to the telephone network 100 and telephone terminal equipment A to the Internet network 200 and the Internet terminal equipment B, and the other way around; replacements in the parts relating to the Internet network 200 and the Internet terminal equipment B to the telephone network 100 and the telephone terminal equipment A. The detailed descriptions here are, therefore, not repeated.

The control unit 10 is furthermore capable of other than processing the calls described above, processing a third call wherein the line to another Internet terminal equipment (e.g. the personal computer (referred in below as an Internet terminal equipment) C in FIG. 3) gets connected after the line to the Internet terminal equipment B is connected, if the Internet terminal equipment B is capable of outputting DTMF signals to the multifunction machine 2 through the Internet network 200. The processes are almost the same, except it requires replacements in the parts relating to the telephone network 100 and telephone terminal equipment A to the Internet network 200 and the Internet terminal equipment B, and in the parts relating to the Internet terminal equipment B to the Internet terminal equipment C. Additionally, the control unit 10 detects the termination of an audio call between the Internet terminal equipment B and the Internet terminal equipment C with input of various signals for disconnecting (disengaging the connection) the line between the Internet network 200 and the multifunction machine 1. The detailed descriptions here are skipped.

(4) The Effect of the Second Embodiment

With the multifunction machine 2 constituted as above, while the line to the telephone terminal equipment A or the Internet terminal equipment B (referred as the terminal equipment of first party in below) is connected in S470 of FIG. 4, a connection to the Internet terminal equipment B, the telephone terminal equipment A or the Internet terminal equipment C (referred as the terminal equipment of second party in below) is requested (or call one of the terminal equipments) in S540 by the transfer command received in S490, if the terminal equipment of second party responds to the (call) request (in S560), the line to the terminal equipment of second party can be also connected. After the second line gets connected, an audio call among three parties; the multifunction machine 2, the terminal equipments of first and second parties can be achieved by inputting/outputting sound corresponding to the audio signals input/output from/to the terminal equipment of second party as well as the audio signals input/output from/to the terminal equipment of first party through a telephone transmitter/receiver. This can be applicable for an audio call among three parties bringing the Internet terminal equipment B connected to the Internet network 200 into the audio call with the telephone terminal equipment A connected to the telephone network 100.

In S600, a relay of audio signals between the telephone terminal equipment A and the Internet terminal equipment B is initiated. The multifunction machine 2 can achieve a transfer function to attain an audio call between the terminal equipments of first and second parties after calling the terminal equipment of second party during the audio call with the terminal equipment of first party.

Figure 4:
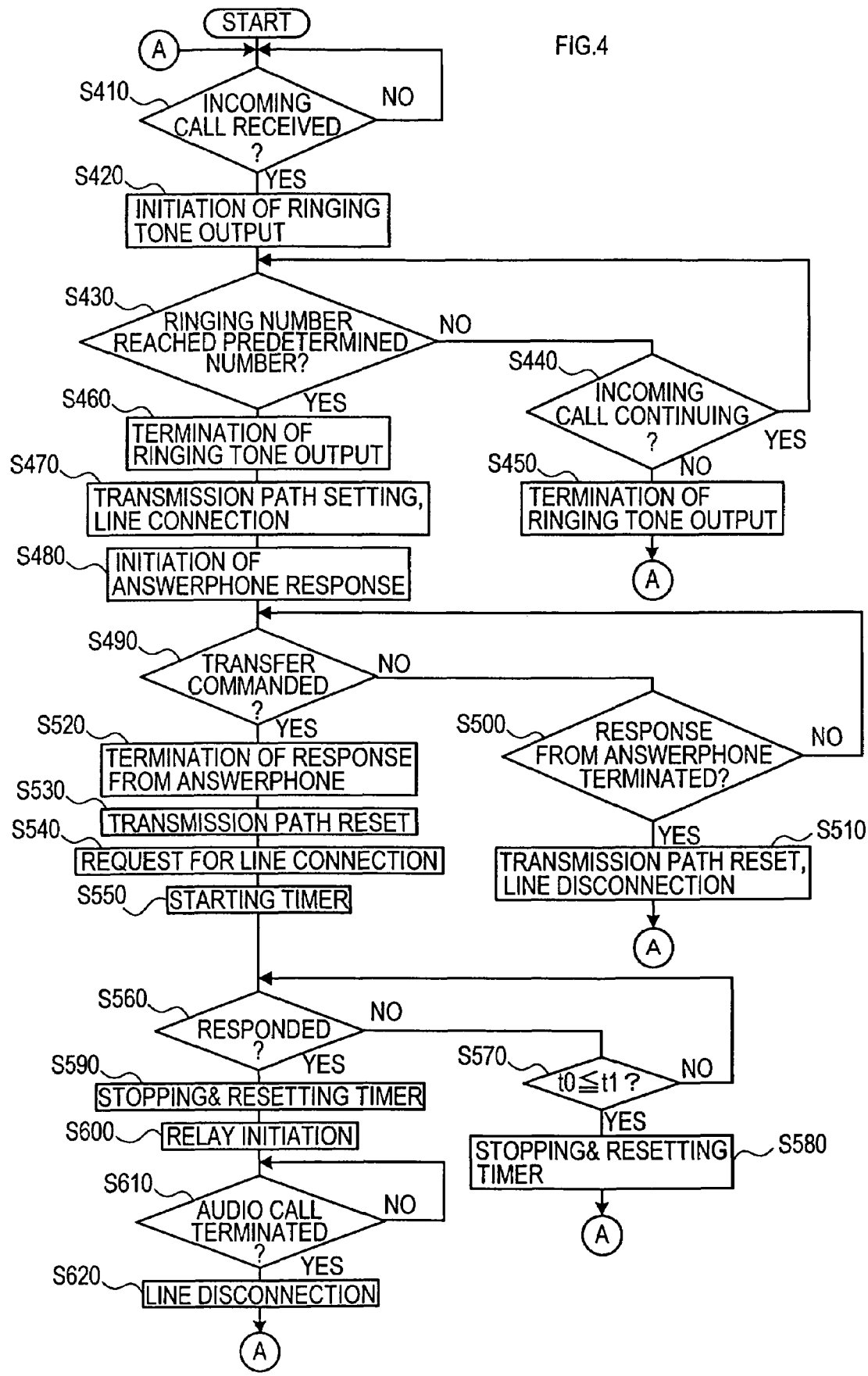
FIG. 4 is a flowchart indicating procedure of the audio process in the second embodiment.

In S490 of FIG. 4, the user of the terminal equipment of first party can command the multifunction machine 2 (the control unit 10) to call the terminal equipment of second party by specifying the terminal equipment of second party with DTMF signals as a transfer command. The user who connects the line to the multifunction machine 2 using the terminal equipment of first party can have the multifunction machine 2 request a connection between the terminal equipment of second party and the multifunction machine 2 (or have the multifunction machine 2 call the terminal equipment of second party) by specifying the terminal equipment of second party with DTMF signals.

When a relay of audio signals takes place in S600 of FIG. 4, the audio signals input in the first path between the telephone network 100 and the line control unit 70 are output to the second path between the communication control unit 60 and the line control unit 70, and the audio signals input from the second path, on the other hand, are output to the first path. Similarly to the first embodiment, when a relay of audio signals between the telephone terminal equipment A (or the Internet terminal equipment 13) and the Internet terminal equipment B (or the telephone terminal equipment A) takes place, audio signals input from one of the terminal equipments can be output to the other terminal equipment after being converted into a signals format transmittable to the network where the signals are output to.

After the line to the terminal equipment of first party gets connected in S470 of FIG. 4, a relay of audio signals can be initiated in S600 when the condition, such as a response of the terminal equipment of second party in S560, (condition for relay initiation) is met.

After the respective lines to the terminal equipments of first and second parties are connected in S600 of FIG. 4, these lines can be disconnected in S620 when a termination of the audio call between the terminal equipments of first and second parties is detected in S610. This can prevent a retainment of the connections to the both terminal equipments without an user operating the multifunction machine 2 after an initiation of the audio call between the terminal equipments of first and second parties.

In S610 of FIG. 4, an input of termination signals (busy tone) indicating disconnection of the line to the multifunction machine 2 can be detected as a termination of the audio call between the two terminal equipments. Furthermore, an input of various signals to disconnect the line to the multifunction machine 2 (to disengage the connection) from the Internet network 200 (the Internet terminal equipment B or C) can be detected as a termination of the audio call between the two terminal equipments.

A connection request (or a call) with the Internet terminal equipment B can be executed by the input of DTMF signals from the telephone terminal equipment A in S490 of FIG. 4. This enables the user who connects the line to the multifunction machine 2 using the telephone terminal equipment A to output DTMF signals to the multifunction machine 2 with an operation on the dial buttons or of the kind, and have the multifunction machine 2 call the Internet terminal equipment B.

Known telephone terminal equipments connected to the telephone network 100 are usually constituted to output DTMF signals to the telephone network 100 corresponding to an operation (pressing) on dial buttons or of the kind. Constituting the multifunction machine 2 to utilize DTMF signals as a cue to call the Internet terminal equipment B is preferable because this enables a telephone terminal equipment without a constitution to output command signals in special signal format to command to call the Internet terminal equipment B.

In S540 of FIG. 4, it is possible to request a connection to (or call) different Internet terminal equipments B having different IF addresses depending on the combination of DTMF signals input in S490. This enables the user making an audio call with the multifunction machine 2 using the telephone terminal equipment A (or the Internet terminal equipment B) to have the multifunction machine 2 connect (or call) the telephone terminal equipment A (or the Internet terminal equipment B) to a desired terminal equipment; the Internet terminal equipment B (or the telephone terminal equipment A, the Internet terminal equipment C) by outputting plural DTMF signals corresponding to the desired Internet terminal equipment B (or the telephone terminal equipment A) for a connection (or a call) by operating dial buttons.

When the number of calling reaches to the predetermined number in S430 of FIG. 4, the line between the multifunction machine 2 and the terminal equipment of second party is connected by setting a transmission path in S470. Without an user operating the multifunction machine 2, processes after S560 enables an audio call between the terminal equipments of first and second parties.

(5) Modifications

The present invention is not limited to the above embodiments. There are other possible modifications and variations with in the scope of the present invention, and some of them are explained in the following sections.

The above embodiments show the multifunction machines land 2 having a constitution of a telephone terminal equipment. Instead of the multifunction machines land 2, a device with a constitution of the telephone terminal equipment of the present invention can be used as long as the device functions as a telephone terminal equipment.

In the above embodiments, call processes in FIG. 2 or 4 are executed by the computer system constituted with the control units 10 of the multifunction machines 1 and 2. Some or entire parts of the call procedure can be executed by some other computer system connected to the multifunction machines 1 or 2 by signal transmission paths with/without wires.

In the above embodiments, the call procedures in FIGS. 2 or 4 are executed following the process procedure stored in the memory of the control unit 10. In case the multifunction machines 1 or 2 is constituted to be able to input/output data from/to a recording medium such as a FD or a memory card, the call processes in FIGS. 2 or 4 can be executed following the above procedure stored in the recording medium.

The first embodiment shows that an on-hook operation in S320 of FIG. 2 is a cue to initiate relaying audio signals in S330. Some other "user's operation" can be the cue to initiate relaying audio signals. For example, an operation component specially for initiating a relay of audio signals (e.g. a switch) can be arranged, and operated. Another example is to set a certain operational procedure to initiate relaying audio signals and execute the operations following the procedure. The operational procedure, here, can be done by a long push (pressing for a certain period of time) on a certain operational button, or operating plural operational buttons in certain order.

In the first embodiment, a relay of audio signals is initiated in S330 after the on-hook operation executed in S320. The initiation of relaying audio signals in S330 can be set at any timing after the lines to the telephone terminal equipment A and the Internet terminal equipment B (or the Internet terminal equipments B, C) are respectively connected by the process of S310. For example, it can be initiated simultaneously with the process of S310; the lines to the telephone terminal equipment A and the Internet terminal equipment B (or the Internet terminal equipments B, C) are respectively connected. In other words, without executing the process of S320, the process of S330 can be executed immediately after the process of 310. This setting can initiate a relay of audio signals at the same time when the lines to the telephone terminal equipment A and the Internet terminal equipment B (or the Internet terminal equipments B, C) are connected by the process of S310.

The second embodiment shows that inputting DTMF signals as a transfer command in the process of S490 in FIG. 4 leads a call of the Internet terminal equipment B in the process of S540. Other command signals can be replaced DTMF signals to lead a call of the Internet terminal equipment B in the process of S540.

In the second embodiment, the connection request (or call) in S540 appoints the Internet terminal equipment B (or the telephone terminal equipment A) corresponding to the combination of DTMF signals input in S490 of FIG. 4. The connection request (or call) in S540 can appoint an Internet terminal equipment B (or a telephone terminal equipment A) previously arranged to correspond to each type of DTMF signals, or an Internet terminal equipment B (or a telephone terminal equipment A) previously arranged to correspond to each combination of DTMF signals.

The second embodiment illustrates that when the number of calling sound reaches to the predetermined number in S430 of FIG. 4, a transmission path is set in S470. A timer can be can be started at the same time with the initiation of outputting calling sound in S420, and when the counter of the timer goes beyond the predetermined time (e.g. 10 second) in S430, the process can be proceeded to S460 where the output of the calling sound is terminated, and the timer is stopped and reset. This constitution can connect the line between the multifunction machine 2 and the telephone terminal equipment A when there is an incoming call provided by the process of S410, even without an user executing an operation to respond the incoming call if there is no operation to respond the incoming call within the predetermined time.

Some parts of the audio process described in the second embodiment and illustrated in FIG. 4 can be arranged as below.

Figure 5:
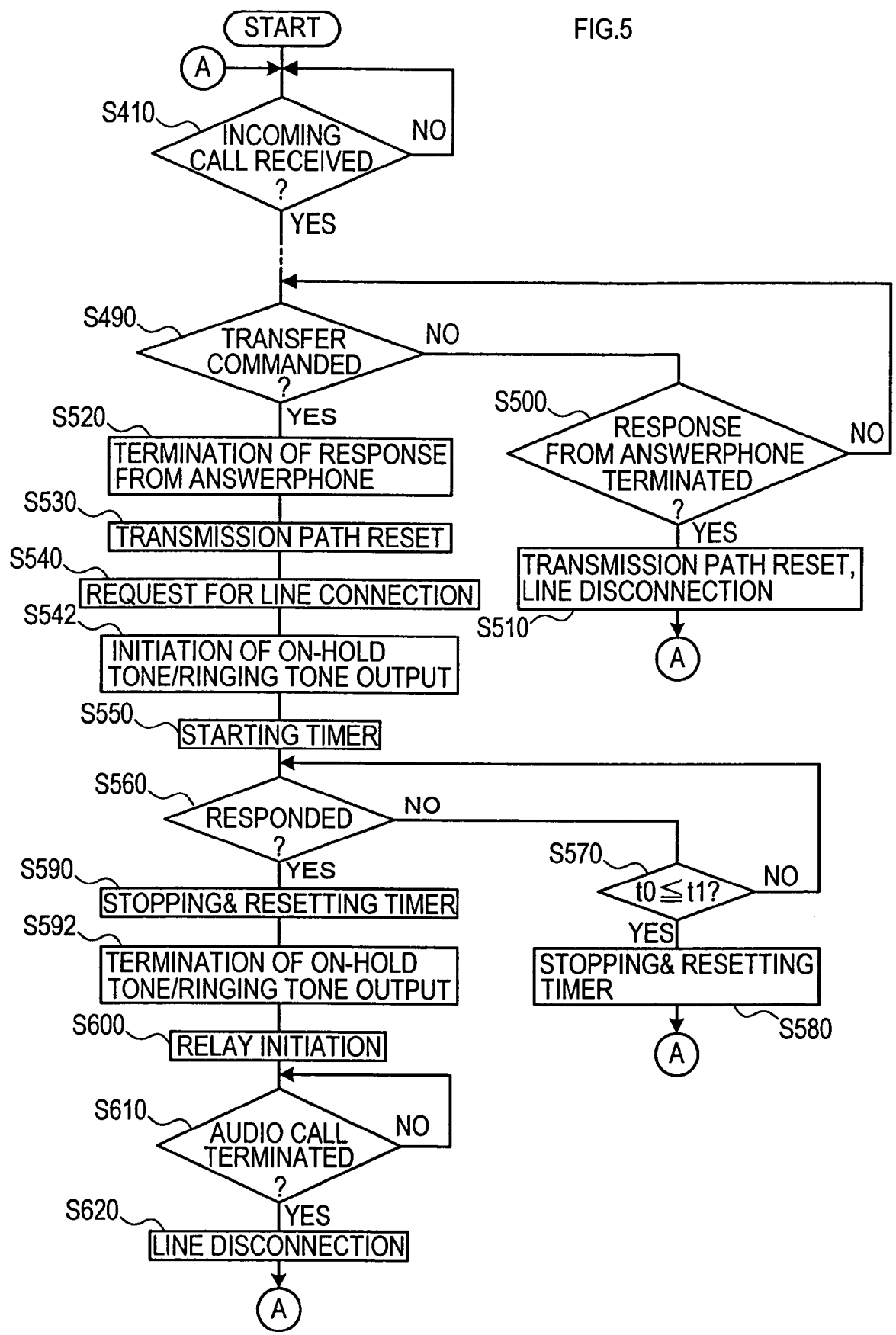
FIG. 5 is a flowchart indicating some part of the procedure of the audio process in modifications.
Figure 6:
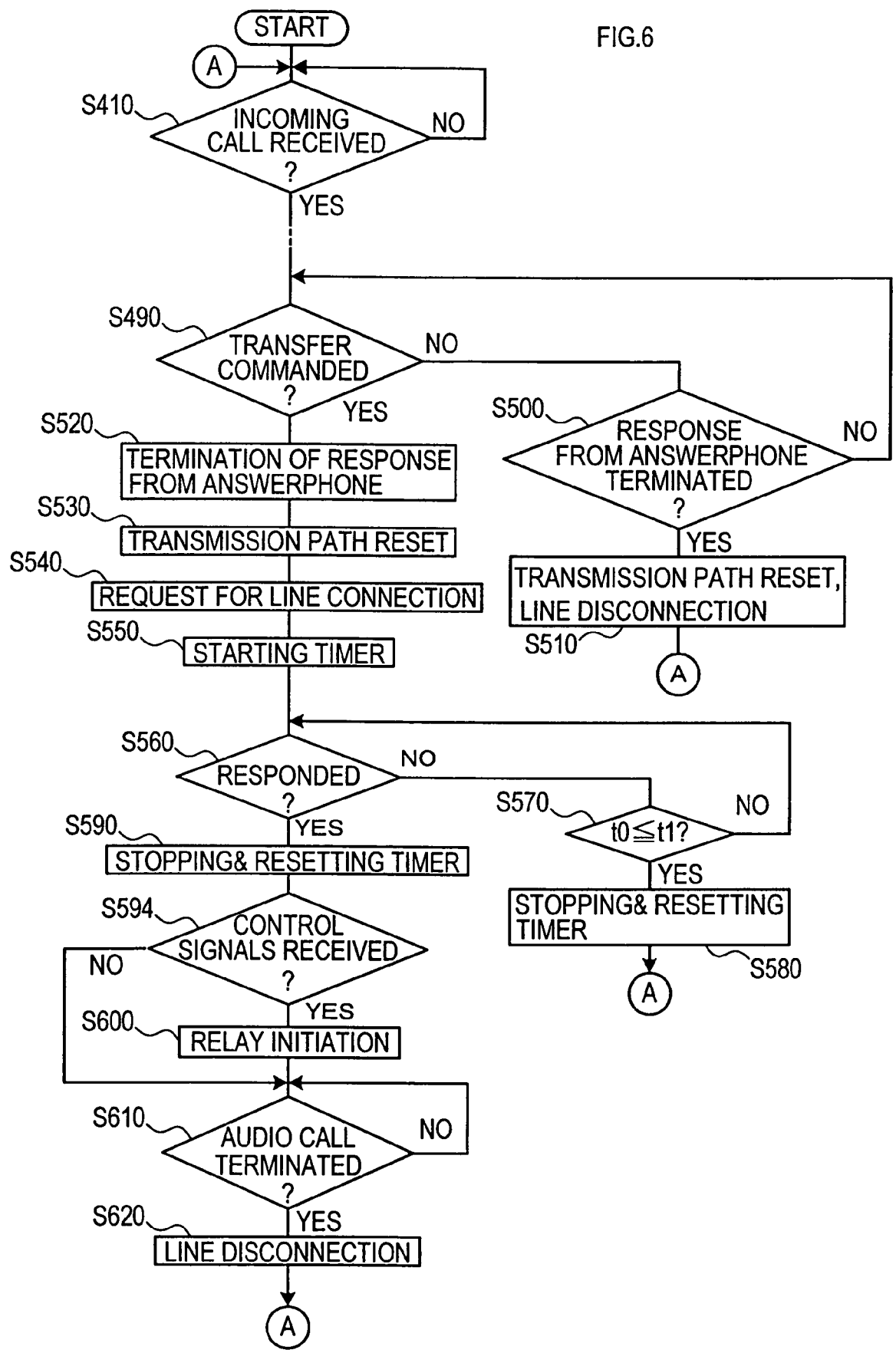
FIG. 6 is a flowchart indicating certain parts of the procedure of the audio process in some other modifications.

After requesting a connection in S540, the control Unit 10, as shown in FIG. 5, initiates outputting the on-hold tone or the calling sound to the telephone terminal equipment A (or the Internet terminal equipment B (S542). In this process, the message playback unit 12a of the recording/playing unit 12 is required to play the on-hold tone or the calling sound repeatedly and to output audio signals of the on-hold tone or the calling sound repeatedly to the telephone terminal equipment A (or the Internet terminal equipment B) through the telephone network 100 (or the Internet network 200).

The control unit 10 stops and resets the timer in the process of S590, and then terminates the output of on-hold tone or the calling sound to the terminal equipment of first party (S592). In this process, The message playback unit 12a of the recording/playing unit 12 is required to terminate the output of the on-hold tone or the calling sound, and the output of audio signals of the on-hold tone or the calling sound to the telephone terminal equipment A (or the Internet terminal equipment B) through the telephone network 100 (or the Internet network 200).

Having this arrangement described above, it is possible to output audio signals of the on-hold tone or the calling sound to the terminal equipment of first party until the terminal equipment of second party responds to the sound in the process of S560. By the on-hold tone or the calling sound originally output from the multifunction machine 2 and output from units which function as telephone transmitter/receiver of the telephone terminal equipment A (or the Internet terminal equipment B), it can be checked if the Internet terminal equipment (or the telephone terminal equipment A) has responded to the connection request (or a call) from the multifunction machine 2.

The second embodiment describes the arrangement wherein a relay of audio signals is initiated in S600, if a condition for relay initiation is met by, for example, a response of the terminal equipment of second party in S560 of FIG. 4. It can also be arranged as below; In case the Internet terminal equipment B (or the telephone terminal equipment A) responds in S560, and stops and resets the timer in S590, if the control unit 10 receives predetermined control signals from one of the terminal equipments connected to the multifunction machine 2 within certain period of time (e.g. 10 seconds)(S594: YES), the process proceeds to S600. On the other hand, if the control unit 10 does not receive the predetermined control signals within certain period of time (S694: NO), the process proceeds to S610.

With this arrangement, it is possible to initiate relaying audio signals in S600 with input of predetermined control signals from the telephone terminal equipment A (or the Internet terminal equipment B) after the Internet terminal equipment B (or the telephone terminal equipment B) responds in S560, and the line to this terminal equipment is connected.

For the "control signals" which is a cue to initiate audio signals in S600, DTMF signals, for example, can be utilized. Usually a telephone terminal equipment to be connected to the telephone network 100 is constituted so that the telephone terminal equipment can output DTMF signals corresponding to an operation on dial buttons to the telephone network 100. Utilizing DTMF signals as the control signals enables a telephone terminal equipment without a constitution to output control signals in a special format to have the audio relay unit initiate a relay of audio signals. In this case, certain kind of DTMF signals and plural DTMF signals with certain combinations can be set as the "control signals". With this setting, the user of a terminal equipment making an audio call with the multifunction machine 2 outputs DTMF signals of certain kind or with certain combinations. This output can initiate a relay of audio signals by the multifunction machine 2 in S600. If the user doesn't know that certain kind or combinations of DTMF signals to initiate a relay of audio signals, the user cannot initiate relaying audio signals. This arrangement, therefore, can be utilized for a user authentication.

What is claimed is:

1. A telephone terminal equipment comprising:
    a first connection unit that connects a line to a terminal equipment of first party which is a terminal equipment of an intended party for an audio call through one of the plural networks including a telephone line network and Internet network,
    a second connection unit that connects a line to a terminal equipment of second party while the line to the terminal equipment of first party is connected by the first connection unit when the terminal equipment of second party responds to a call provided through one of the plural networks based on a command to call the terminal equipment of second party which is different from the terminal equipment of first party,
    an audio relay unit that relays audio signals between the terminal equipments of first and second parties by outputting audio signals input from one of the terminal equipments of first and second parties to the other terminal equipment after the lines to the terminal equipments of first and second parties are connected by the first and second connection units.

2. The telephone terminal equipment as set forth in claim 1, further comprising:
    a designation command unit that designates the terminal equipment of second party to an user of the telephone terminal equipment, and commands to call the terminal equipment of second party to the second connection unit
    wherein the second connection unit calls the terminal equipment of second party based on the command provided by the designation command unit while the line to the terminal equipment of first party is connected by the first connection unit.

3. The telephone terminal equipment as set forth in claim 1, wherein the second connection unit calls the terminal equipment of second party based on command signals input from the terminal equipment of first party to designate the terminal equipment of second party for a call.

4. The telephone terminal equipment as set forth in claim 3, wherein the second connection unit calls the terminal equipment of second party based on predetermined DTMF signals input as command signals from the terminal equipment of first party while the line to the terminal equipment of first party is connected by the first connection unit.

5. The telephone terminal equipment as set forth in claim 4, wherein the second connection unit calls a terminal equipment identified by one of kinds and combinations of DTMF signals as the terminal equipment of second party.

6. The telephone terminal equipment as set forth in claim 1, wherein the first connection unit connects the line to the terminal equipment of first party in case the user does not execute an operation to respond to an incoming call received from the terminal equipment of first party.

7. The telephone terminal equipment as set forth in claim 1, further comprising an audio signal output unit to output predetermined audio signals to the terminal equipment of first party until the terminal equipment of second party responds to the call provided by the second connection unit.

8. The telephone terminal equipment as set forth in claim 7, wherein the audio signal output unit outputs audio signals of on-hold tone used to place an audio call on hold.

9. The telephone terminal equipment as set forth in claim 7, wherein the audio signals output unit outputs audio signals indicating that the second connection unit is calling the terminal equipment of second party.

10. The telephone terminal equipment as set forth in claim 1, wherein the audio relay unit outputs audio signals input from the terminal equipment of first party, after converting the signals into a format transmittable to a second network to the terminal equipment of second party, to the terminal equipment of second party through the second network, in case a first network to the terminal equipment of first party and the second network are different, and outputs audio signals input from the terminal equipment of second party to the terminal equipment of first party through the first network after converting the signals into a transmittable format to the first network.

11. The telephone terminal equipment as set forth in claim 10, wherein the line to the terminal equipment of first party is an audio connection between the telephone terminal equipment and a terminal equipment of a public telephone line network, and the line to the terminal equipment of second party is an audio connection between the telephone terminal equipment and a terminal equipment of the internet network.

12. The telephone terminal equipment as set forth in claim 1, wherein the audio relay unit initiates relaying audio signals at the same time when the line to the terminal equipment of second party is connected by the second connection unit.

13. The telephone terminal equipment as set forth in claim 1, wherein the audio relay unit initiates relaying sound signals after the line to the terminal equipment of second party is connected by the second connection unit, and when predetermined condition for relay initiation is met.

14. The telephone terminal equipment as set forth in claim 13, wherein the audio relay unit initiates relaying audio signals determining the condition for relay initiation is met when a user executes predetermined operation.

15. The telephone terminal equipment as set forth in claim 13, wherein the audio relay unit initiates relaying audio signals determining the condition for relay initiation is met when the telephone terminal equipment inputs predetermined control signals from one of the terminal equipments of first and second parties.

16. The telephone terminal equipment as set forth in claim 15, wherein the audio relay unit initiates relaying audio signals determining the condition for relay initiation is met when the telephone terminal equipment inputs predetermined DTMF signals from one of the terminal equipments of first and second parties.

17. The telephone terminal equipment as set forth in claim 1, further comprising a first termination detection unit,
wherein the first connection unit disconnects the line to the terminal equipment of first party when the first termination detection unit detects a termination of an audio call, and
wherein the second connection unit disconnects the line to the terminal equipment of second party after the line to the terminal equipment of second party is connected when the first termination detection unit detects a termination of an audio call.

18. The telephone terminal equipment as set forth in claim 17, wherein the first termination detection unit detects a termination of an audio call by an input of termination signals indicating a termination of an audio call from the terminal equipment of first party.

19. The telephone terminal equipment as set forth in claim 1, further comprising a second termination detection unit,
wherein the second connection unit disconnects the line to the terminal equipment of second party when the second termination detection unit detects a termination of an audio call, and
wherein the first connection unit disconnects the line to the terminal equipment of first party after the second connection unit connects the line to the terminal equipment of second party when the second termination detection unit detects a termination of an audio call.

20. The telephone terminal equipment as set forth in claim 19, wherein the second termination detection unit detects a termination of an audio call by an input of termination signals indicating a termination of an audio call from the terminal equipment of second party.

21. The telephone terminal equipment as set forth in claim 1, wherein the line to the terminal equipment of first party establishes an audio call between a user of the telephone terminal equipment and the first party, and the line to the terminal equipment of second party establishes an audio call between the user of the telephone terminal equipment and the second party, and
wherein the line to the terminal equipment of first party and the line to the terminal equipment of second party establish a three-way audio call among the user of the telephone terminal equipment, the first party and the second party.

22. A storage medium for storing a terminal control program for use in a computer system to execute a various steps of a procedure to achieve an audio call by inputting/outputting sound corresponding to audio signals transferred from one of plural networks including a telephone network and an Internet network the program comprising:
a first connection procedure that connects a line to a terminal equipment of first party which is terminal equipment of an intended party through one of the plural networks,
a second connection procedure that connects a line to a terminal equipment of second party, while the line to the terminal equipment of first party is connected in the first connection procedure, when the terminal equipment of second party responds to a call corresponding to a command to call the terminal equipment of second party which is a different terminal equipment from the terminal equipment of first party, and
a audio relay procedure that relays audio signals between the terminal equipments of first and second parties by outputting audio signals input from one of the terminal equipments of first and second parties to the other terminal equipment after the lines to the terminal equipments of first and second parties are connected in the first and second connection procedures.

23. An audio call method comprising the steps of:
connecting a line to a terminal equipment of first party which is a terminal equipment of an intended party for an audio call through one of the plural networks including a telephone line network and Internet network,
connecting a line to a terminal equipment of second party while the line to the terminal equipment of first party is connected when the terminal equipment of second party responds to a call provided through one of the plural networks based on a command to call the terminal equipment of second party which is different from the terminal equipment of first party, and
relaying audio signals between the terminal equipments of first and second parties by outputting audio signals input from one of the terminal equipments of first and second parties to the other terminal equipment after the lines to the terminal equipments of first and second parties are connected.

* * * * *